Patented Apr. 11, 1944

2,346,632

UNITED STATES PATENT OFFICE 2,346,632

ORGANIC DISINFECTING AGENT IN A SPECIAL FORM

Eugen Wolfert, Leverkusen-Wiesdorf, and Hansheinz Daab, Cologne, Germany, assignors to Winthrop Chemical Company, Inc., New York, N. Y., a corporation of New York No Drawing. Application May 7, 1940, Serial No. 333,765. In Germany April 29, 1939

5 Claims. (Cl. 167—22)

In U. S. specification Serial No. 333,764 organic disinfecting agents in the form of foils or sheets have been described. This form gives a rapid and convenient means of preparing solutions of disinfecting agents ready for use.

As the disinfecting agents employed differ in their properties, for instance, as regards melting point and elasticity, good results are not obtained in all cases when the disinfecting agents are used as such. If substances having a low melting point are employed foils are obtained which adhere and show other disadvantages. If disinfecting agents having a high melting point are used high temperatures are necessary to obtain fusion. This may cause damage to the substance or to its carrier employed.

We have found that these and other disadvantages may be avoided by adding indifferent substances which do not impair the disinfecting power of the disinfecting agents and which improve those physical properties which are decisive for manufacturing the foils or sheets, for instance, increase or lower the melting point. The various specific physical shapes of the carriers are hereinafter collectively referred to as sheet-like.

Especially suitable additional materials are substances containing carboxylic acid amide groups. Compounds of this class are, for instance, urea and its derivatives, mono- or polybasic acid amides or acid imides such as acetic acid amide, propionic acid amide, etc. Other indifferent useful additions are, for instance, polyethylene oxides, if necessary, in mixture with condensation products from ethylene oxide and compounds containing hydroxy groups such as castor oil. The addition agents are chosen suitably and in such amounts, that fused products are obtained the melting point of which is between 100–130° C.

The manufacture of the fused products may be performed in the following manner:

The disinfecting agent is mixed with the inert material and the mixture is heated to form the fused product or one component is melted and the other component is introduced into the melt. It is also possible to dissolve the compounds in a suitable readily volatile solvent.

The following examples illustrate our invention without, however, restricting it thereto, the parts being by weight:

Example 1

Equal parts of carbamic-acid-ethylester and of dodecylamide of dimethyl-benzyl-ammoniumchloride acetic acid are melted together and the melt applied to a sheet-like carrier (ribbons of paper, mull) by pouring or dipping. When solid, pieces of a desired size are cut.

Example 2

A melt consisting of equal parts of dimethylalkyl-(p-nitro-benzyl)-ammonium chloride, wherein alkyl means a mixture of hydrocarbon radicals containing 12–16 carbon atoms, and succinic acid imide is worked up according to Example 1.

Example 3

A melt of 1 part of acetyl-monoethyl-urea and 2 parts of dimethyl-alkyl-(p-nitro-benzyl)-ammonium chloride, wherein alkyl means a mixture of hydrocarbon radicals containing 12–16 carbon atoms, is worked up according to Example 1.

Example 4

2 parts of crystallized phenol are mixed with 10 parts of urea and 0.5 part of a mixture consisting of 100 parts of polyethylene oxide (obtainable according to Example 1 of German specification 597,496) and 10 parts of the condensation product from 40 mol. ethylene oxide and 1 mol. castor oil (obtainable according to German specification 605,973) and melted together. The melt is applied to a sheet-like carrier (for instance, ribbons of paper, mull, water-soluble cellulose films) by pouring or dipping. When cool pieces of a desired size are cut.

For further illustration the following fused products may be mentioned:

(a) 2 parts of dodecylamide of dimethyl-benzyl-ammonium-chloride acetic acid are melted with 1 part of urea.

(b) 2 parts of diethyl-dodecyl-benzyl-ammonium-bromide are mixed with 1 part of urea and melted together.

(c) 2 parts of dimethyl-alkyl-(p-nitro-benzyl)-ammonium chloride, wherein alkyl represents a mixture consisting of hydrocarbon radicals with 12–16 carbon atoms, are mixed with 1 part of urea and melted.

(d) 2 parts of dimethyl-alkyl-(benzyl)-ammonium chloride, wherein alkyl represents a mixture of hydrocarbon radicals containing 12–16 carbon atoms, are melted together with 3 parts of urea and 1 part of a mixture consisting of 100 parts of polyethylene oxide (obtainable according to Example 1 of German specification 597,496), and 10 parts of the condensation product from 40 mol. ethylene oxide and 1 mol. castor oil (obtainable according to German specification 605,973).

(e) 2 parts of dimethyl-alkyl-(nitro-o-chlorobenzyl)-ammonium chloride are melted with 1 part of urea.

(f) 2 parts of dimethyl-dodecyl-trichlorobenzyl-ammonium chloride are mixed with 1 part of urea and melted.

(g) 1 part of dimethyl-dodecyl-(trichloro-benzyl)-ammonium chloride and 2 parts of alkyl-dimethyl-benzyl-ammonium chloride, wherein alkyl represents a mixture of hydrocarbon radicals containing 8-18 carbon atoms are mixed with 3 parts of urea and melted.

(h) 3 parts of dimethyl-alkyl-benzyl-ammonium chloride, wherein alkyl represents a mixture of hydrocarbon radicals containing 8-18 carbon atoms, and 3 parts of dimethyl-alkyl-(p-nitro-benzyl)-ammonium chloride, wherein alkyl represents a mixture of hydrocarbon radicals containing 12-16 carbon atoms, are mixed with 4 parts of urea and 1 part of a mixture consisting of 100 parts of polyethylene oxide (obtainable according to Example 1 of German specification 597,496) and 10 parts of the condensation product from 40 mol. ethylene oxide and 1 mol. castor oil (obtainable according to German specification 605,973) and melted.

By adding, for instance, 0.03-0.05% of the disodium salt of 4'-sulfonamidophenylazo-7-acetylamino-1-hydroxy-naphthalene - 3.6 - disulfonic acid, calculated on the weight of the melts, the melts can be dyed red.

We claim:

1. Foils or sheets consisting of a sheet-like cellulosic carrier coated with an organic disinfecting agent selected from the group of compounds containing at least one quaternary nitrogen atom and one higher alkyl radical fused with a substance containing a carboxylic acid amide group.

2. Foils or sheets consisting of a sheet-like cellulosic carrier coated with an organic disinfecting agent selected from the group of compounds containing at least one quaternary nitrogen atom and one higher alkyl radical fused with urea.

3. Foils or sheets consisting of paper in sheet-like form coated with an organic disinfecting agent selected from the group of compounds containing at least one quaternary nitrogen atom and one higher alkyl radical fused with urea.

4. An organic disinfecting medium comprising a sheet-like carrier coated with the fusion product of a higher alkyl quaternary ammonium compound and urea, said quaternary ammonium compound being capable of being fused with urea without decomposition.

5. An organic disinfecting medium comprising a sheet-like carrier coated with the fusion product of a higher alkyl quaternary ammonium compound and urea, said quaternary ammonium compound being capable of being fused with urea without decomposition, the quaternary ammonium compound and the urea being so proportioned that their fusion product has a melting point ranging from about 100 to 130° C.

EUGEN WOLFERT.
HANSHEINZ DAAB.